US006738602B1

(12) United States Patent
Heinen et al.

(10) Patent No.: US 6,738,602 B1
(45) Date of Patent: May 18, 2004

(54) INTEGRABLE CIRCUIT FOR THE FREQUENCY CONDITIONING OF RADIO TRANSCEIVER, IN PARTICULAR A CORDLESS TELEPHONE, OPERATING IN THE UHF RANGE

(75) Inventors: Stefan Heinen, Krefeld (DE); Stefan Beyer, Mering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/419,010

(22) Filed: Oct. 13, 1999

Related U.S. Application Data

(63) Continuation of application No. PCT/DE99/00397, filed on Feb. 11, 1999.

(30) Foreign Application Priority Data

Feb. 13, 1998 (DE) .......................... 198 05 963

(51) Int. Cl.[7] .......................... H04B 1/40; H04B 1/44; H04L 5/14
(52) U.S. Cl. .......................... 455/76; 455/78; 455/83; 370/276
(58) Field of Search .......................... 455/74.1, 76, 78, 455/83, 188.2, 82, 84, 85, 86; 375/219; 370/276, 278, 280, 282, 294

(56) References Cited

U.S. PATENT DOCUMENTS

| | | | | |
|---|---|---|---|---|
| 5,224,119 A | * | 6/1993 | Barabash et al. | 375/295 |
| 5,319,799 A | * | 6/1994 | Morita | 455/78 |
| 5,444,865 A | * | 8/1995 | Heck et al. | 455/86 |
| 5,483,679 A | * | 1/1996 | Sasaki | 455/86 |
| 5,519,885 A | * | 5/1996 | Vaisanen | 455/76 |
| 5,535,247 A | * | 7/1996 | Gailus et al. | 375/297 |
| 5,603,097 A | * | 2/1997 | Kanou | 455/76 |
| 5,734,970 A | * | 3/1998 | Saito | 455/76 |
| 5,987,309 A | * | 11/1999 | Adachi et al. | 455/86 |
| 6,122,326 A | * | 9/2000 | Jackson et al. | 375/308 |

FOREIGN PATENT DOCUMENTS

| | | |
|---|---|---|
| DE | 3631068 A1 | 3/1988 |
| DE | 4143197 A1 | 11/1992 |
| DE | 19502111 A1 | 8/1995 |
| DE | 19713102 A1 | 11/1997 |
| EP | 0793356 A2 | 9/1997 |
| GB | 2279848 A | 1/1995 |
| GB | 2296141 A | 6/1996 |

* cited by examiner

*Primary Examiner*—Vivian Chin
*Assistant Examiner*—Yuwen Pan
(74) *Attorney, Agent, or Firm*—Laurence A. Greenberg; Werner H. Stemer; Ralph E. Locher

(57) ABSTRACT

A circuit is provided for time division duplexing with a frequency hopping technique and has a total of just two frequency synthesizers for the transmission and reception paths and only one up-converter in the transmission path. The UHF synthesizer frequency is additionally subjected to frequency division prior to insertion as a heterodyne frequency of the assigned converter in the transmission and reception paths, which, owing to the shorter transient recovery times, makes it possible to utilize the UHF frequency synthesizers at different frequencies for the transmission and reception slots, respectively. A particular application is in cordless telephones.

11 Claims, 3 Drawing Sheets

US 6,738,602 B1

INTEGRABLE CIRCUIT FOR THE FREQUENCY CONDITIONING OF RADIO TRANSCEIVER, IN PARTICULAR A CORDLESS TELEPHONE, OPERATING IN THE UHF RANGE

CROSS-REFERENCE TO RELATED APPLICATION

This application is a continuation of copending International Application PCT/DE99/00397, filed Feb. 11, 1999, which designated the United States.

BACKGROUND OF THE INVENTION

Field of the Invention

The invention relates to an integrable circuit for frequency conditioning in a radio transceiver, in particular a cordless telephone, operating in an UHF range in particular at 900 MHz, and functioning as a time division duplex system. The time division duplex system alternately forms transmission and reception time slots with a frequency hopping technique that allocates a frequency to each time slot according to a defined scheme. The circuit is formed of amplifiers, filters and converters provided in a transmission path and a reception path. The transmission and reception paths are both alternately connected to a common antenna via a time division duplex switch that can be change over in a controlled manner.

Defined UHF frequency ranges can be used for free radio services in many states if specific, precisely prescribed conditions are adhered to. By way of example, in the USA the frequency range between 902 MHz and 928 MHz is available as the so-called industrial scientific and medical (ISM) band.

Radio services, that is to say e.g. cordless telephones, are permitted to be realized in the UHF-frequency band. In this case, however, it is necessary to adhere to the boundary conditions specified by the Federal Communications Commission (FCC) authority with respect to the channel spacing, the 20 dB bandwidth, the output power, etc.

There are essentially three system approaches for realizing a cordless telephone. The first of these approaches consists in an embodiment as a so-called direct sequence spread spectrum system. In this case, the radio signal is modulated with a high-bit-rate sequence of digital signals, the so-called pseudonoise (PN) code, in such a way that a broadband transmission signal results from the superposition. Each bit of the message signal to be transmitted is thus coded with the PN code in a transmitter, which PN code can be decoded again in a receiver that knows the PN code.

The second of the system approaches consists in the realization of a so-called low power system. In this case, there are no restrictive regulations below a transmission power of approximately 0 dBm.

The third system approach consists in an embodiment as a so-called frequency hopping spread spectrum system. In the case of the aforementioned ISM band, for example, these systems are permitted to have a maximum channel spacing of 500 kHz, where 99% of the power has to be emitted within this bandwidth. Consequently, at least 50 channels are available in that case, which are utilized on the basis of a pseudorandom sequence.

SUMMARY OF THE INVENTION

It is accordingly an object of the invention to provide an integrable circuit for the frequency conditioning of a radio transceiver, in particular a cordless telephone, operating in the UHF range which overcomes the above-mentioned disadvantages of the prior art devices of this general type, in which a frequency conditioning architecture is specified which enables the highest possible integration level for a frequency hopping method. In particular, the intention is to specify an efficient frequency plan which avoids undesirable mixed products and at the same time enables an optimum time division multiplex (TDMA; Time Division Multiple Access) frame format.

Furthermore, the object of the invention is to realize the smallest possible channel spacing of 200 kHz to 300 kHz in order that dynamic channels on which severe interference occurs can be masked out. At the same time, the intention is not to exceed a frame period of 4 ms in order that echo compensation can be dispensed with.

With the foregoing and other objects in view there is provided, in accordance with the invention, a circuit for frequency conditioning in a radio transceiver operating in an ultra high frequency (UHF) range and functioning as a time division duplex system (TDD), the time division duplex system alternately forming transmission and reception time slots and has a frequency hopping technique (FH) allocating a frequency to each time slot according to a defined scheme, the circuit including:

- an IF frequency synthesizer having a first phase-locked loop and a first phase-regulated HF oscillator for generating a directly modulated output signal;
- a UHF frequency synthesizer having a second phase-locked loop and a second phase-regulated HF oscillator for generating an output frequency which is a UHF heterodyne frequency;
- a first 1:n frequency divider receiving the output frequency of the UHF frequency synthesizer and dividing down the output frequency, the first 1:n frequency divider outputting a first divided UHF output frequency having a value of 1/n times that of the output frequency;
- a single up-converter receiving the directly modulated output signal of the IF frequency synthesizer as an input frequency and the first divided UHF output frequency from the first 1:n frequency divider, the single up-converter generating an up-converted output signal;
- a filter receiving the up-converter output signal and outputting a filtered up-converted output signal;
- a transmission amplifier stage receiving the filtered up-converted output signal from the filter and outputs an amplified output signal, the IF frequency synthesizer, the UHF frequency synthesizer, the single up-converter, the filter and the transmission amplifier stage define a transmission path;
- a time division duplex switch having a reception access path and a transmission access path receiving the amplified output signal from the transmission amplifier stage, the time division duplex switch is a controlled time division duplex switch that can be switch in a controlled manner;
- a low-noise amplifier connected to the reception access path of the time division duplex switch;
- a UHF reception filter connected to the low-noise amplifier;
- a second 1:n frequency divider receiving the UHF heterodyne frequency from the UHF frequency synthesizer and generates a second divided UHF output frequency;

a first down-converter having a first input connected to the UHF reception filter and a second input receives the second divided UHF output frequency, the first down-converter outputs a first down-converted output signal;

a first IF bandpass filter of an upper IF plane receiving the first down-converted output signal and outputs a filtered down-converted output signal;

a second down-converter has an output, a first input receiving the filtered down-converted output signal and a second input receiving the directly modulated output signal generated by the IF frequency synthesizer and being present as a heterodyne frequency;

a second IF bandpass filter of a lower IF plane is connected to the output of the second down-converter;

a first amplifier connected to the second IF bandpass filter;

a third IF bandpass filter connected to the first amplifier;

a second amplifier connected to the third IF bandpass filter;

a demodulator connected to the second amplifier;

the IF frequency synthesizer, the UHF frequency synthesizer, the low-noise amplifier, the UHF reception filter, the first down-converter, the first IF bandpass filter, the second down-converter, the second IF bandpass filter, the first amplifier, the third IF bandpass filter, the second amplifier and the demodulator define a reception path; and a common antenna connected to the reception path and the transmission path via the time division duplex switch.

In the inventive circuit, merely two frequency synthesizers are necessary in the circuit according to the invention. Consequently, a third frequency synthesizer is omitted, which considerably promotes a higher integration level.

Furthermore, the configuration of the circuit according to the invention allows the use of inexpensive external filters.

By virtue of the synthesis of the required UHF oscillator signal at at least twice the frequency as used in prior art circuits, the phase detector reference frequency is increased, with the result that the transient recovery time of the UHF frequency synthesizer can be halved.

Consequently, two transient processes can be accommodated within the same frame period. These facts make it possible to utilize the UHF frequency synthesizer at different frequencies for the transmission and reception slots, that is to say the frequency offset due to the second intermediate frequency is compensated for by the UHF frequency synthesizer.

It is expedient for the up-conversion that takes place in the transmission path to be effected by an up-converter with suppression of image frequencies, in which case the 90° phase shift between the input signals can be generated by frequency dividers.

Other features which are considered as characteristic for the invention are set forth in the appended claims.

Although the invention is illustrated and described herein as embodied in an integrable circuit for the frequency conditioning of a radio transceiver, in particular a cordless telephone, operating in the UHF range, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
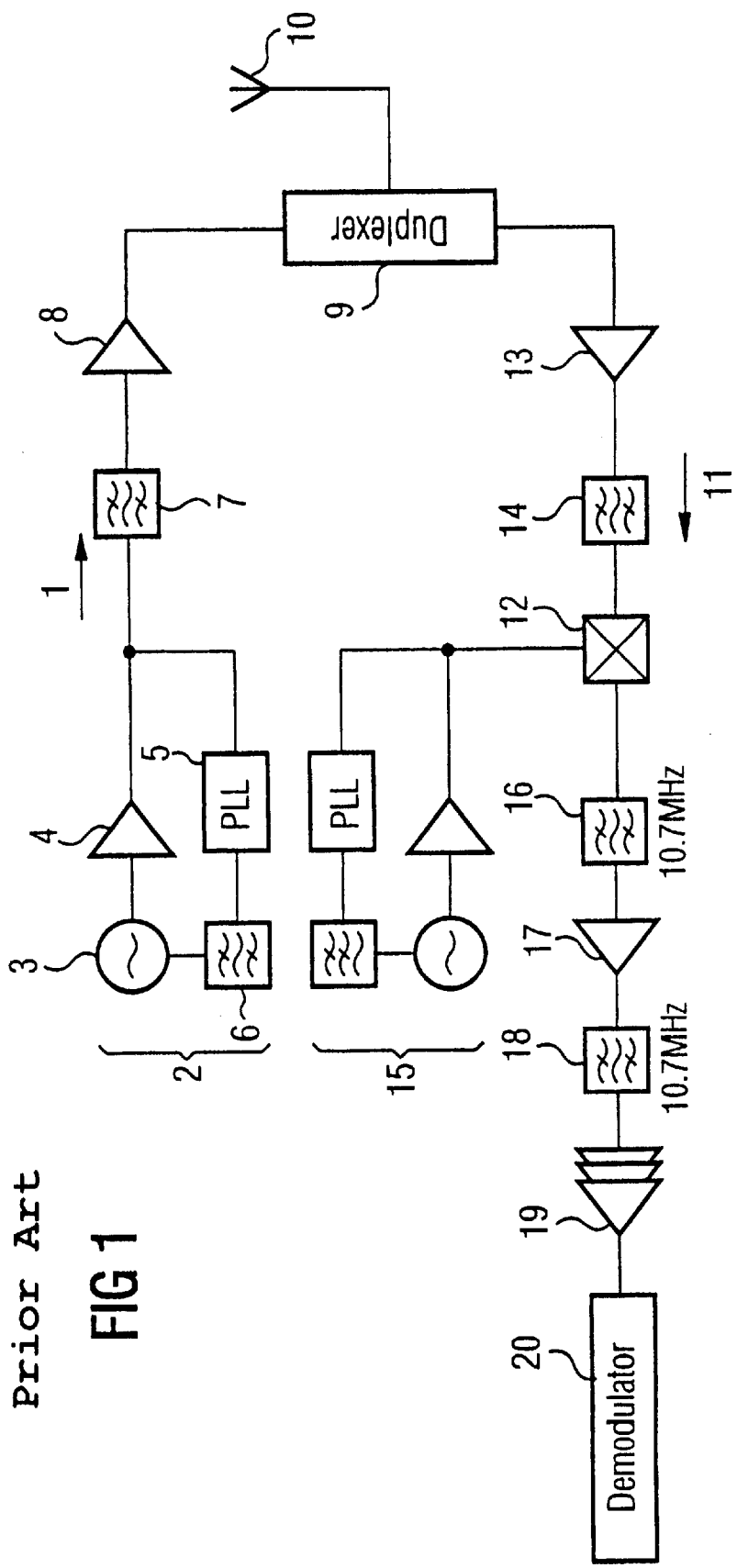
FIG. 1 is a diagrammatic, block diagram of a prior art circuit of a frequency division duplex (FDD) system with low output power.

In all the figures of the drawing, sub-features and integral parts that correspond to one another bear the same reference symbol in each case. Referring now to the figures of the drawing in detail and first, particularly, to FIG. 1 thereof, there is shown a system which has been used to date for the aforementioned radio services, e.g. a cordless telephone. A frequency division duplex (FDD) system with a low output power (0 dBm) is involved in this case.

A transmission path 1 of a transceiver illustrated in FIG. 1 contains a UHF frequency synthesizer 2, which has a voltage-controlled oscillator (VCO) 3, an amplifier 4, a phase-locked loop (PLL) 5, a low-pass filter 6, a downstream transmission bandpass filter 7 and a transmission output stage 8. The transmission path 1 is connected to the transmission input of a frequency duplexer 9, which is a filter that effects sharp frequency separation.

An antenna 10, which serves both for transmission and for reception, is connected to the frequency duplexer 9. In the reception path 11 of the transceiver, an input of a down-converter 12 is connected to a receiver terminal of the frequency duplexer 9 via a low-noise amplifier 13 and a bandpass filter 14. The other input of the down-converter 12 is supplied by a UHF frequency synthesizer 15 which, with regard to the type of its components, is constructed identically to the UHF frequency synthesizer 2 for the transmission path 1.

The output of the down-converter 12 is connected to a demodulator 20 via a first IF filter 16, an IF amplifier 17, a second IF filter 18 and another IF amplifier 19. The IF plane is located at 10.7 MHz in the example according to FIG. 1. The modulation in the transmission path 1 is effected directly at the UHF frequency synthesizer 2 therein.

The disadvantages of this embodiment resides in the high selectivity of the frequency duplexer 9 required and in the limited range on account of the low output power. Modification that can be implemented without a high technical outlay to form a frequency hopping system is not possible on account of the small bandwidth of the PLL phase-locked loops and of the two UHF frequency synthesizers 2 and 15.

Figure 2:
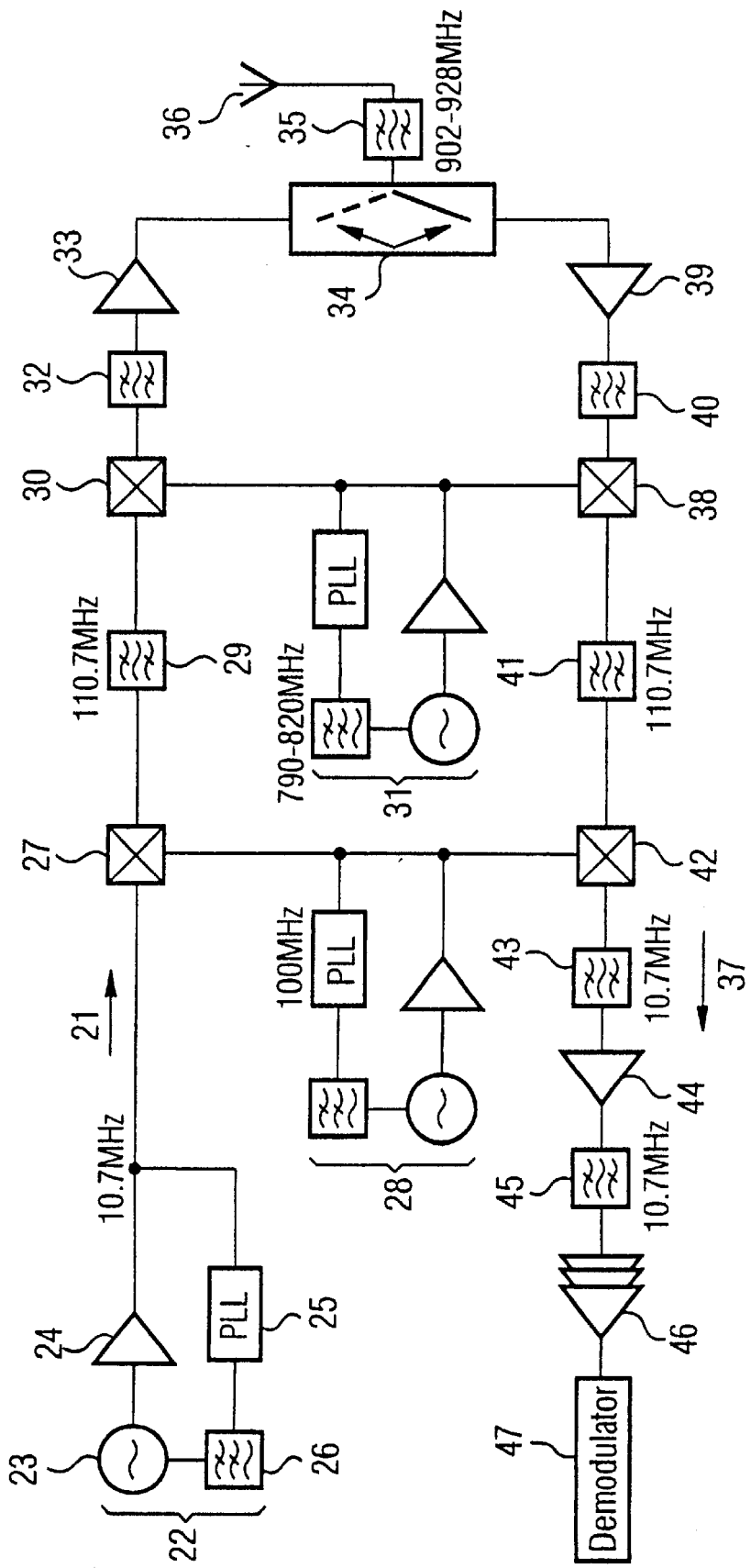
FIG. 2 is a block diagram of another prior art circuit of a time division duplex (TDD) system and frequency hopping technique.

Transferring the above system approach described with reference to FIG. 1 to a time division duplex (TDD) system, as is required for use of the frequency hopping method, results in a system as is illustrated in FIG. 2 and explained below. Such a system can be used for the aforementioned radio services, that is to say e.g. a cordless telephone. A transmission path 21 of the transceiver illustrated in FIG. 2 has, at its start, a frequency synthesizer 22, which operates at 10.7 MHz and contains a voltage-controlled oscillator 23, an amplifier 24, a PLL phase-locked loop 25 and a low-pass filter 26. Direct modulation is effected at the frequency synthesizer 22.

In the transmission path 21, there follows, with one of its inputs, an up-converter 27 receiving an output frequency from the frequency synthesizer 22. An output signal of an IF frequency synthesizer 28 operated at 100 MHz is fed as a heterodyne signal to the up-converter 27 at its other input, which IF frequency synthesizer 28, with regard to the type of its components, is constructed identically to the frequency synthesizer 22.

An output signal of the up-converter 27 is fed in a higher IF plane of 110.7 MHz via an IF filter 29 to a first input of a further up-converter 30, at whose second input an output signal of a UHF frequency synthesizer 31 is present as a heterodyne frequency. The UHF frequency synthesizer 31 can be varied in a frequency range of between 790 MHz and 820 MHz and, with regard to the type of its components, is likewise constructed identically to the frequency synthesizer 22.

An output signal of the further up-converter 30 is fed to a downstream transmission bandpass filter 32 and a transmission output stage 33. The transmission path 21 is then connected to the transmission input of a time division duplex switch 34, which is a temporally controlled changeover switch and alternately activates the transmission and reception time slots. An antenna 36, which serves both for transmission and for reception, is connected to the antenna output of the time division duplex switch 34 via a bandpass filter 35 for 902 MHz to 928 MHz.

In a reception path 37 of the transceiver illustrated, an input of a down-converter 38 is connected to a receiver terminal of the time division duplex switch 34 via a low-noise amplifier 39 and a bandpass filter 40. The other input of the down-converter 38 is supplied by the UHF frequency synthesizer 31, which is also provided for the transmission path 21.

The output of the down-converter 38 is connected in a higher IF plane via an IF filter 41 for 110.7 MHz to one input of a further down-converter 42, which is supplied by the IF frequency synthesizer 28 at its other input. The IF frequency synthesizer 28 is also provided for the up-converter 27 as a generator of an IF heterodyne frequency of 100 MHz in the transmission path 21.

The further down-converter 42 is then connected to a demodulator 47 in a lower IF plane via an IF filter 43 for 10.7 MHz, an IF amplifier 44, a further IF filter 45 for 10.7 MHz and another amplifier 46. The modulation in the transmission path 21 is effected directly at the first frequency synthesizer 22.

The disadvantage of this embodiment option resides in the high outlay on filters in the transmission path 21. A further disadvantage is that three frequency synthesizers are required. In addition to the high outlay for the filters at the first transmission and reception intermediate frequencies, the additional terminals reduce the integration level that can be achieved.

Figure 3:
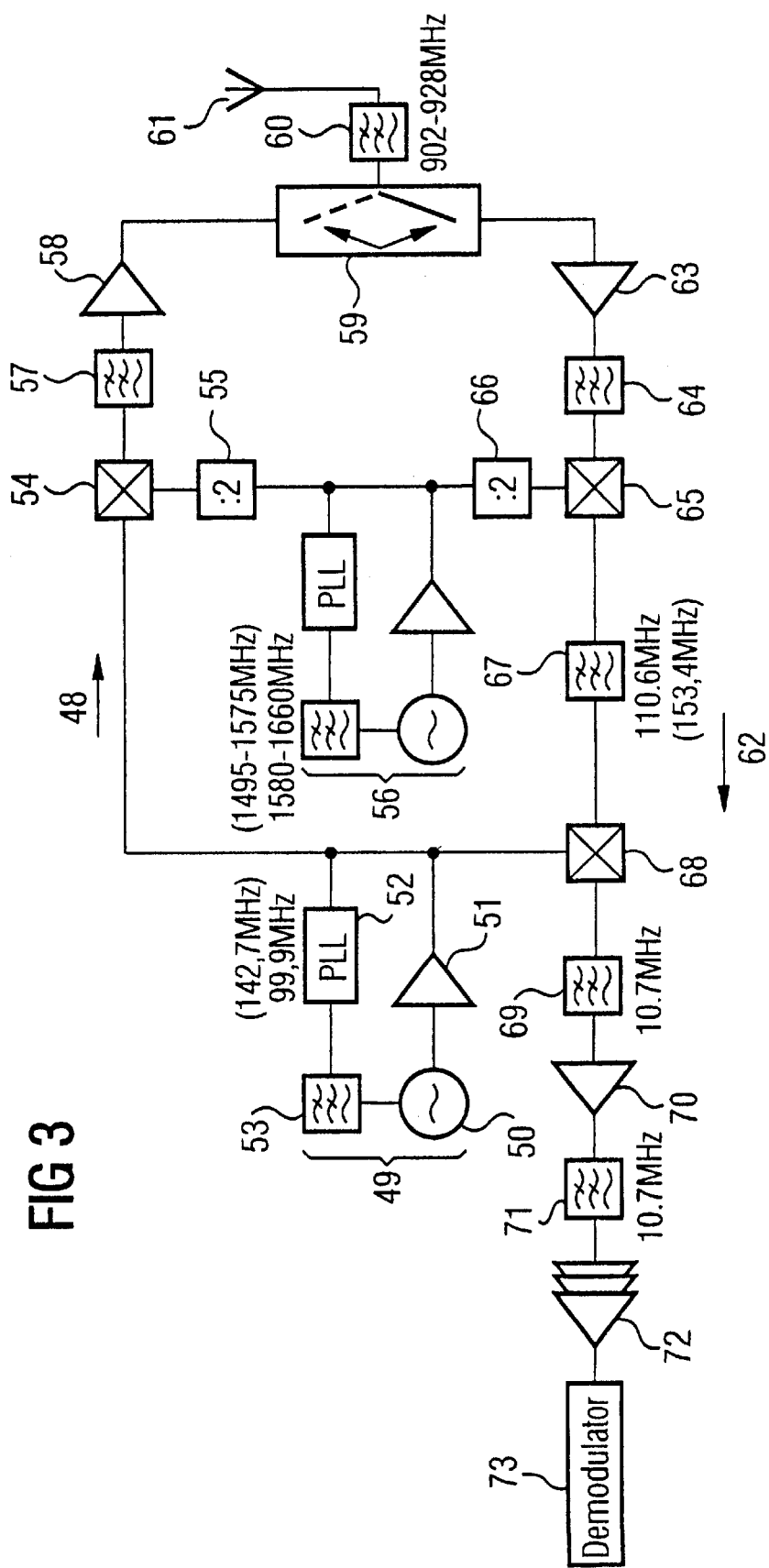
FIG. 3 is a block diagram of a circuit with the time division duplex (TDD) system and enabling of the implementation of the frequency hopping technique according to the invention.

A circuit configured according to the invention for a time division duplex (TDD) system, as is required for use of the frequency hopping method, is illustrated in FIG. 3 and is explained below. Such a system can be used for the aforementioned radio services, that is to say a cordless telephone, for example.

In the example illustrated, the system operates in an operating frequency range of between 902 MHz and 928 MHz with a channel spacing of approximately 200 kHz. A transmission path 48 of a transceiver illustrated in FIG. 3 has, at its start, an IF frequency synthesizer 49, which operates at 99.9 MHz and contains a voltage-controlled oscillator 50, an amplifier 51, a PLL phase-locked loop 52 and a low-pass filter 53.

At the IF frequency synthesizer 49, direct modulation with a vector modulator is effected, the modulation used being a digital frequency modulation, preferably a Gaussian minimum shift keying (GMSK) modulation or a Gaussian frequency shift keying (GFSK) modulation.

The transmission path 48 is provided with just a single up-converter (step-up mixer) 54, to which the directly modulated output signal of the IF frequency synthesizer 49 at 99.9 MHz is fed as an input frequency. The up-converter 54 also receives as an input an output frequency in a range of 1580 MHz to 1660 MHz of a UHF frequency synthesizer 56 which is fed as an UHF heterodyne frequency (an UHF superimposed frequency). The output frequency is divided down by a 1:2 frequency divider 55 and has a value twice that of the divided heterodyne frequency. The UHF frequency synthesizer 56, with regard to the type of its components, is constructed in exactly the same way as the IF frequency synthesizer 49 already explained.

The up-converter 54 in the transmission path 48 has a device for suppressing image frequencies. A 90° phase shift between the two input signals of the up-converter 54 in the transmission path 48 is generated by frequency dividers. The output of the up-converter 54 is connected via a bandpass filter 57 and also a transmission output amplifier stage 58 to a transmission access of a time division duplex switch 59, which is a temporally controlled changeover switch and alternately activates the transmission and reception time slots.

An antenna 61, which serves both for transmission and for reception, is connected to the time division duplex switch 59 via a bandpass filter 60.

In the reception path 62, a reception access of the time division duplex switch 59 is connected via a low-noise amplifier 63 and a UHF reception filter 64 to the first input of a first down-converter (step-down mixer) 65, at whose second input the output frequency of the UHF frequency synthesizer 56 at from 1580 MHz to 1660 MHz is present as a UHF heterodyne frequency (an UHF superimposed frequency). The output frequency is passed via a corresponding 1:2 frequency divider 66.

The output of the down-converter 65 is connected via an IF bandpass filter 67 of an upper IF plane of 110.6 MHz to one input of a second down-converter (step down mixer) 68, at whose second input the frequency of 99.9 MHz generated by the IF frequency synthesizer 49 is present as a heterodyne frequency. An output of the second down-converter 68 of the reception path 62 is connected to a demodulator 73 via a first IF bandpass filter 69 and a first IF amplifier 70 and also a second IF bandpass filter 71 and an amplifier 72 of a lower IF plane of 10.7 MHz. The demodulator 73 provided in the reception path 62 is expediently a vector or frequency demodulator.

The frequency plan specified with the exemplary embodiment explained above and another advantageous frequency plan which can likewise be expediently used in a circuit configured according to the invention are listed below in a table.

|  | Plan I | Plan II |
|---|---|---|
| Transmission and/or reception band | 902–928 MHz | 902–928 MHz |
| Channel spacing | Approx. 200 kHz | Approx. 200 kHz |
| Upper IF | 110.6 MHz | 153.4 MHz |
| Lower IF | 10.7 MHz | 10.7 MHz |
| UHF Synthesizer | 1580–1660 MHz | 1495–1575 MHz |
| IF Synthesizer | 99.9 MHz | 142.7 MHz |

We claim:

1. A circuit for frequency conditioning in a radio transceiver operating in an ultra high frequency (UHF) range and functioning as a time division duplex system (TDD), the time division duplex system alternately forming transmission and reception time slots and has a frequency hopping technique (FH) allocating a frequency to each time slot according to a defined scheme, the circuit comprising:
- an IF frequency synthesizer having a first phase-locked loop and a first phase-regulated HF oscillator for generating a directly modulated output signal;
- a UHF frequency synthesizer having a second phase-locked loop and a second phase-regulated HF oscillator for generating an output frequency being a UHF heterodyne frequency;
- a first 1:n frequency divider receiving the output frequency of said UHF frequency synthesizer and dividing down the output frequency, said first 1:n frequency divider outputting a first divided UHF output frequency having a value of 1/n times that of the output frequency;
- a single up-converter receiving the directly modulated output signal of said IF frequency synthesizer as an input frequency and the first divided UHF output frequency from said first 1:n frequency divider, said single up-converter generating an up-converted output signal;
- a filter receiving said up-converter output signal and outputting a filtered up-converted output signal;
- a transmission amplifier stage receiving said filtered up-converted output signal from said filter and outputting an amplified output signal, said IF frequency synthesizer, said UHF frequency synthesizer, said single up-converter, said filter and said transmission amplifier stage defining a transmission path;
- a time division duplex switch having a reception access path and a transmission access path receiving the amplified output signal from said transmission amplifier stage, said time division duplex switch being a controlled time division duplex switch that can be switch in a controlled manner;
- a low-noise amplifier connected to said reception access path of said time division duplex switch;
- a UHF reception filter connected to said low-noise amplifier;
- a second 1:n frequency divider receiving the UHF heterodyne frequency from said UHF frequency synthesizer and generating a second divided UHF output frequency;
- a first down-converter having a first input connected to said UHF reception filter and a second input receiving the second divided UHF output frequency, said first down-converter outputting a first down-converted output signal;
- a first IF bandpass filter of an upper IF plane receiving the first down-converted output signal and outputting a filtered down-converted output signal;
- a second down-converter having an output, a first input receiving said filtered down-converted output signal and a second input receiving the directly modulated output signal generated by said IF frequency synthesizer and being present as a heterodyne frequency;
- a second IF bandpass filter of a lower IF plane connected to said output of said second down-converter;
- a first amplifier connected to said second IF bandpass filter;
- a third IF bandpass filter connected to said first amplifier;
- a second amplifier connected to said third IF bandpass filter;
- a demodulator connected to said second amplifier;
- said IF frequency synthesizer, said UHF frequency synthesizer, said low-noise amplifier, said UHF reception filter, said first down-converter, said first IF bandpass filter, said second down-converter, said second IF bandpass filter, said first amplifier, said third IF bandpass filter, said second amplifier and said demodulator defining a reception path; and
- a common antenna connected to said reception path and said transmission path via said time division duplex switch.

2. The circuit according to claim 1, wherein said up-converter in said transmission path suppresses image frequencies.

3. The circuit according to claim 1, wherein the first divided UHF output frequency is 90° phase shifted in said first 1:n frequency divider in regards to the directly modulated output signal of said IF frequency synthesizer.

4. The circuit according to claim 1, wherein said IF frequency synthesizer in said transmission path is a vector modulator performing digital frequency modulation, and said demodulator in said reception path is a demodulator selected from the group consisting of vector demodulators and frequency demodulators.

5. The circuit according to claim 4, wherein the digital frequency modulation is a Gaussian minimum shift keying modulation.

6. The circuit according to claim 4, wherein the digital frequency modulation is a Gaussian frequency shift keying modulation.

7. The circuit according to claim 1, wherein the circuit has an operating frequency range of between 902 MHz and 928 MHz with a channel spacing of 200 kHz.

8. The circuit according to claim 7, wherein said UHF frequency synthesizer generates alternateable frequencies between 1580 MHz and 1660 MHz, said IF frequency synthesizer forms frequencies at 99.9 MHz, said lower IF plane is located at a frequency of 10.7 MHz, and said upper IF plane is located at a frequency of 110.6 MHz.

9. The circuit according to claim 7, wherein said UHF frequency synthesizer generates alternateable frequencies between 1495 MHz and 1575 MHz, said IF frequency synthesizer forms frequencies at 142.7 MHz, said lower IF plane is located at a frequency of 10.7 MHz, and said upper IF plane is located at a frequency of 153.4 MHz.

10. The circuit according to claim 1, wherein the ultra high frequency (UHF) range is at 900 MHz.

11. The circuit according to claim 1, wherein the radio transceiver is a cordless telephone.

* * * * *